Oct. 8, 1968  W. F. BERCK  3,404,567
APPARATUS FOR ELIMINATING AIR FLOW THROUGH FLUID METERS
Filed June 13, 1967  3 Sheets-Sheet 1
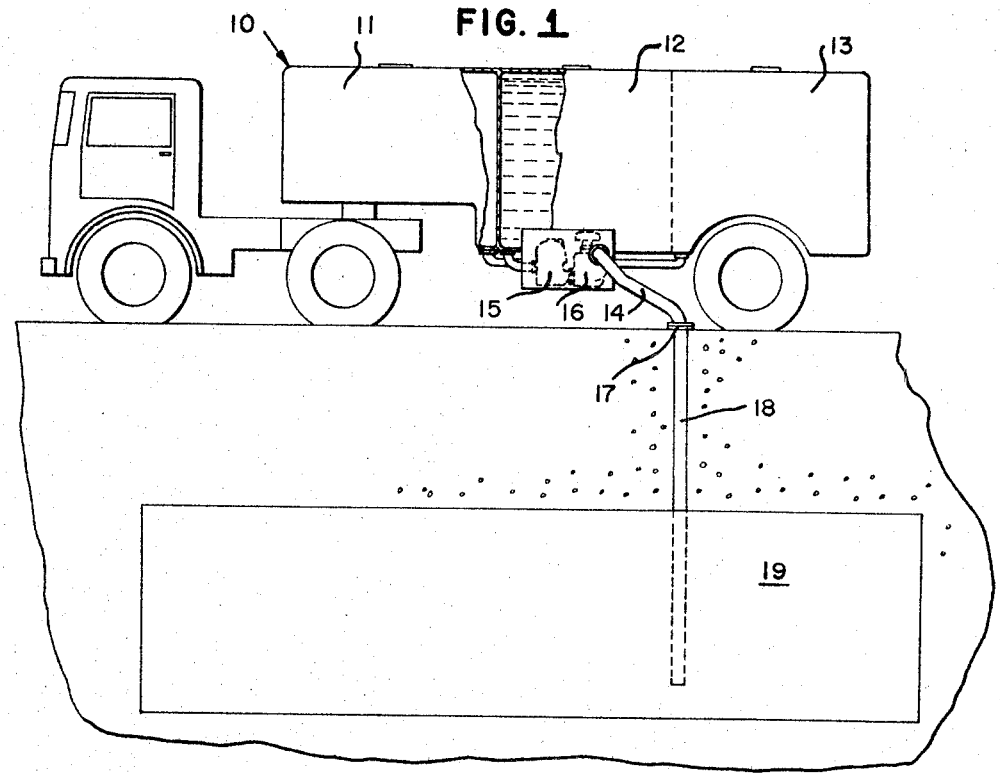
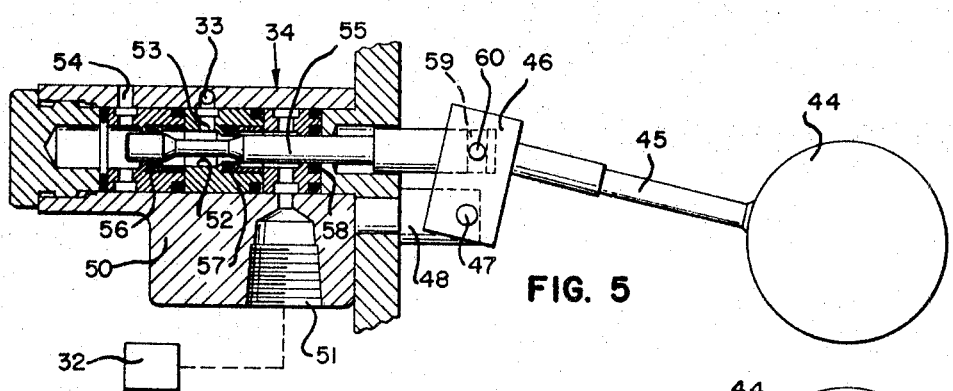
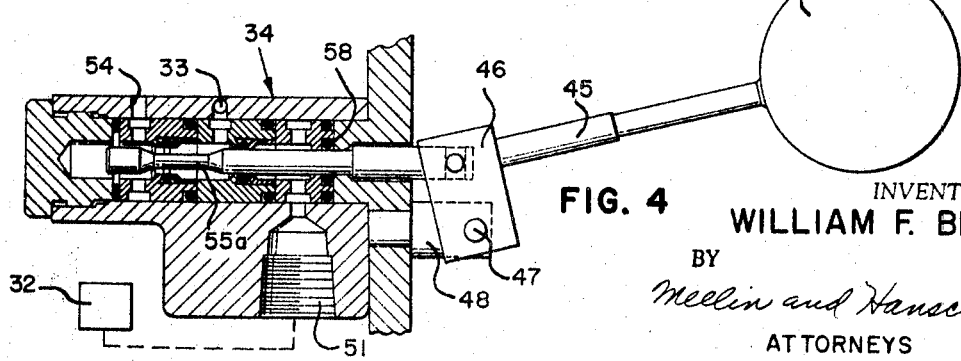
INVENTOR.
WILLIAM F. BERCK
BY
Meelin and Hanscom
ATTORNEYS

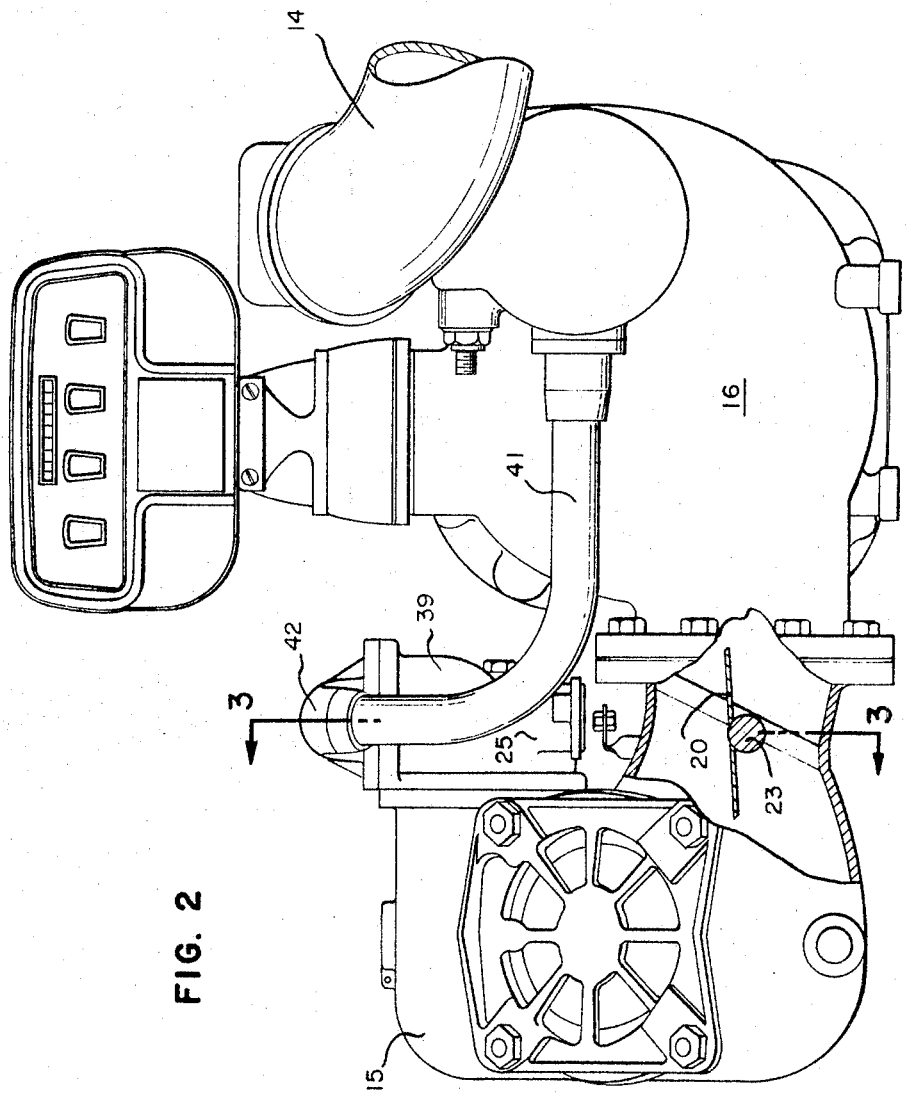

INVENTOR.
WILLIAM F. BERCK
BY
Mellin and Hanscom
ATTORNEYS

United States Patent Office 3,404,567
Patented Oct. 8, 1968

3,404,567
APPARATUS FOR ELIMINATING AIR FLOW THROUGH FLUID METERS
William F. Berck, Hayward, Calif., assignor to Rockwell Manufacturing Company, Statesboro, Ga., a corporation of Pennsylvania
Continuation-in-part of application Ser. No. 337,450, Jan. 13, 1964. This application June 13, 1967, Ser. No. 645,838
3 Claims. (Cl. 73—200)

ABSTRACT OF THE DISCLOSURE

A device for preventing gases from being metered by a fluid meter in a high-speed gravity gasoline delivery system from a tank truck into an underground tank through an airtight hose, in which an air separator, whose float steers a compressed air-powered valving system, accumulates just enough air to break the siphon in the hose, discharges that amount of air into the hose in one bubble while stopping the liquid flow to break any suction vortex in the line, and then sharply re-establishes full flow.

---

This application is a continuation-in-part of my copending application, Ser. No. 337,450, filed Jan. 13, 1964, now abandoned.

This invention generally relates to fluid metering systems and particularly to apparatus employed therewith for eliminating entrained air or gases from the metered flow line as to prevent false registration.

Apparatus of the general kind herein described has also been the subject matter of many previous inventions, including my issued Patents Nos. 3,021,684, 3,040-573 and 3,040,574, which patents depend upon the use of a pump in a metereing system to provide the power for moving the fluid therethrough. The apparatus and methods described in my above mentioned patents however, cannot be used in gravity fed metering systems where the liquid must flow without benefit of a pump and where the only moving force is derived from the limited pressure of the "positive head" on the upstream side of the meter and/or the "negative head" of liquid downstream of the meter. The present invention is particularly directed to apparatus that may be used with this latter type of metering system for eliminating accumulated air that is trapped in a collecting chamber, although this apparatus may also be used with a pump-pressurized system.

One typical use for a gravity-type metering system is in connection with mobile tanks or delivery vehicles. Such vehicles contain one or more compartments from which fluid is delivered by gravity through a meter and discharged from a delivery hose into a fill pipe of an underground storage tank. A control valve for shutting off the fluid flow may be provided on the discharge side of the meter, and in many instances the delivery hose is coupled to the fill pipe of the underground storage tank in a leakproof manner so that the metering system develops a "negative head" of pressure on the downstream side of the meter that extends to the lower end of the fill pipe, near the bottom of the storage tank. Alternatively, the metering system for the delivery vehicle may use a downspout connected to the discharge end of the hose without forming a tight coupling with the fill pipe. In this instance, the "negative pressure head" is determined by the length of the downspout alone.

It is well known that the rate of fluid flow in a gravity feed liquid system is dependent on the combined "positive" and "negative" pressure heads existing in the flow line. Of course, the initial rate of flow is dependent solely upon the "positive" liquid head, since there is no fluid on the downstream side of the meter to produce a "negative" liquid head. However, as the hose and fill pipe on the downstream side of the meter begin to fill, a "negative head" is developed by the gravity force of the fluid therein, thereby increasing the rate of fluid flow through the meter. The "negative liquid head" added to the "positive liquid head" produces a total gravity force which may result in a very high rate of flow and which is not obtained by a "positive liquid head" alone. Although the maximum rate of fluid flow occurs shortly after the full negative liquid head is developed, since the positive liquid head continually diminishes, the "negative liquid" head is usually capable of maintaining the meter speed at a relatively high level.

As a vehicle compartment approaches empty, a vortex will normally be formed around the compartment's outlet or sump. This vortex tends to draw air into the fluid where it becomes entrained. Although devices known as "vortex breakers" are employed, small amounts of air may nevertheless become entrained in the fluid, and unless eliminated will pass through the meter producing an error in measurement. Another type of metering error may be introduced where the compartment of a delivery vehicle has been emptied and the lines from the sump to the meter are partially filled with air. Refilling the tank compartment may trap large pockets of air in the metering line and this air, which may represent a considerable volume, will then be washed through the meter when the control valve is opened for making the next delivery.

The above difficulty in effecting an accurate recording of metered flows has always been present in making a gravity-type delivery from a tank truck. In former years, the rates of flow were quite low and a conventional air separator with float-operated air release valve could be used to eliminate entrained air and prevent entrapment of the air in the metering flow line. However, present day requirements demand higher rates of fluid delivery, and speeds of 350 to 450 gallons a minute are now being achieved with a gravity delivery. At these relatively high rates of flow, it is impossible to provide an air separator of reasonable size that may be installed on a tank truck and yet be effective. The present invention, therefore, involves a novel means for preventing the measurement of air in a fluid metering system, especially systems where the fluid is moved by gravity.

In brief, the present invention comprises apparatus for channeling, by the use of an air-powered servo system, and through a bypass line around the meter, bubbles of just enough accumulated air to disrupt the "negative pressure head" and momentarily retard or impede the liquid flow through the meter, followed by immediate re-establishment of full flow. For this purpose, an actuating mechanism comprising a spring bias and an air-operated cylinder are provided, together with a pressurized air supply and a float-operated control valve. The float, which operates the control valve, rides upon the surface of a conventional but comparatively small air collection chamber disposed on the upstream side of the meter; and when the liquid level is lowered by a just sufficient accumulation of air or other gas to break the siphon downstream, the control valve is operated to connect the air cylinder to the air supply, closing a shut-off valve in the metering flow line while simultaneously opening a normally closed valve in the bypass line, which extends between the air collection chamber and the discharge side of the meter.

One principal object of this invention is, therefore, to provide a novel apparatus effective at high flow rates for eliminating entrained air and venting such air to the downstream side of a meter.

Another object is to provide apparatus of the kind described in a metering system having a flow rate that is essentially determined by the "negative liquid head" on the downstream side of a meter, and where the venting of accumulated air to the discharge side of the meter will be just enough to break the siphon effect of the "negative liquid head," followed by re-establishment of full flow.

It is yet another object of this invention to provide metering apparatus of the kind described which may utilize the standard air-brake pressure supply conventional to most tank delivery vehicles for closing a shut-off valve in a metering flow line while simultaneously venting accumulated amounts of air to the discharge side of a flow meter.

Other objects of this invention will become apparent in view of the following detailed description and the accompanying drawings.

In the drawings forming a part of this application and in which like parts are identified by like reference numerals throughout the same, FIG. 1 is a side elevation of a delivery vehicle with certain parts broken away and shown in section, wherein fluid stored within one of several compartments of the delivery vehicle is being discharged through a fill pipe into an underground storage tank;

FIG. 2 is a detail and elevation of the metering apparatus used with the vehicle, including a gas collecting chamber and related apparatus employed therewith;

FIG. 4 is an enlarged section of the control valve taken on lines 4—4 of FIG. 3, showing its position when the air collection chamber is filled with liquid; and FIG. 5 is another section of the control valve showing an alternate position of the valve when the collection chamber has been substantially filled with air or other gas.

Figure 3:
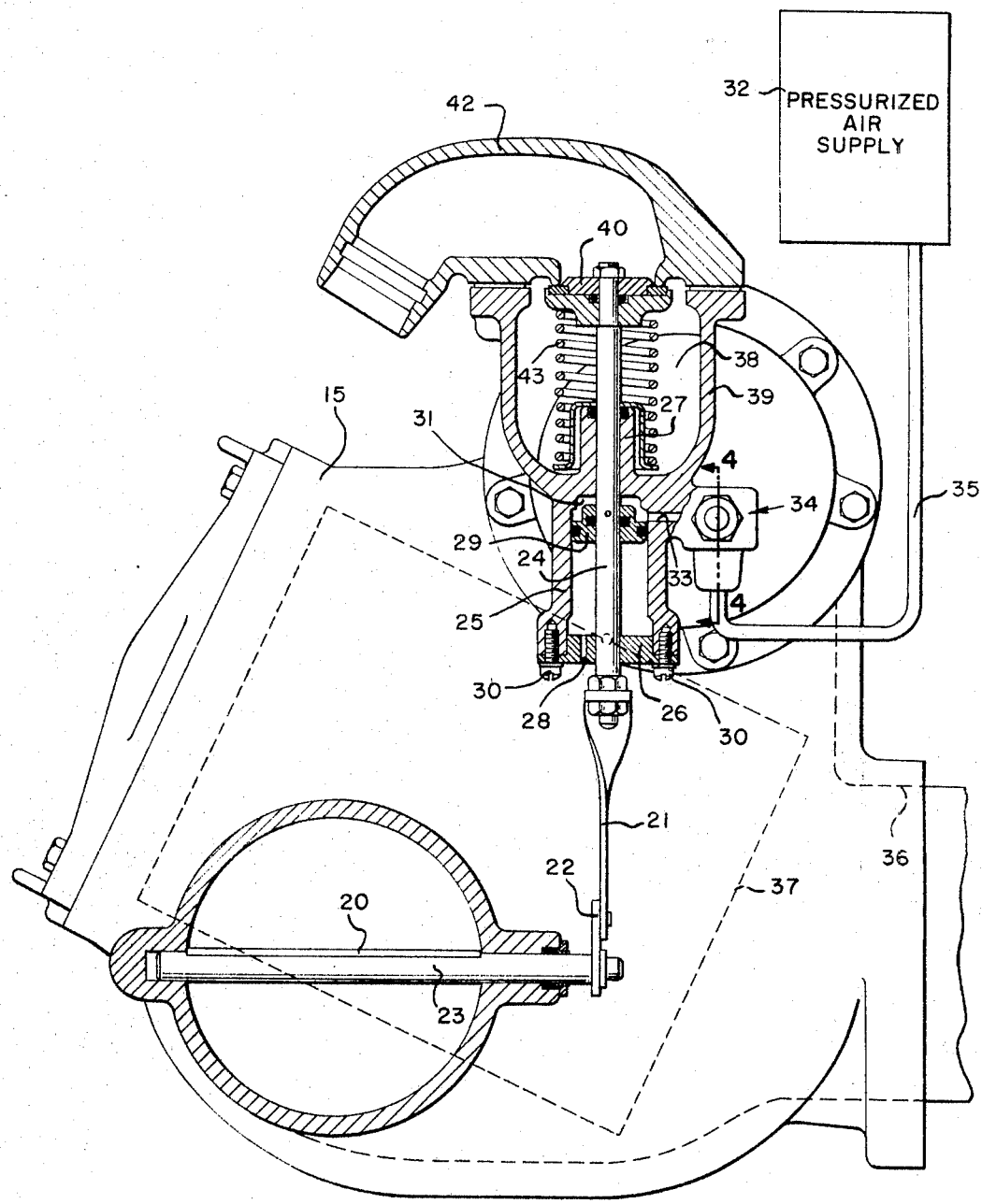
FIG. 3 is an enlarged section taken essentially along lines 3—3 of FIG. 2.

Referring to FIG. 1 of the drawings, there is shown a preferred embodiment of the invention in a delivery vehicle 10 having a plurality of liquid compartments 11, 12 and 13 that may be selectively and alternately connected to a discharge flow line 14 through an air collection chamber 15 and metering apparatus 16. The valve system which is used for making selective connection of chambers 11, 12 and 13 to the air collection chamber 15, while not being shown, is of conventional design and forms no part of the present invention. A pipe connection 17, which joins the discharge end of line 14 to the fill pipe 18 of an underground storage tank 19, is essentially air tight, as are all fluid connections intermediate storage chambers 11, 12 or 13 and flow line 14. Thus, once fluid has been conducted through flow line 14 and introduced into fill pipe 18, there will be a siphon pressure developed by the "negaitve head" on the discharge side of meter 16.

This invention is more particularly directed to the apparatus shown in FIGS. 2–5. In particular, a butterfly valve 20 is disposed on the upstream side of meter 16 in the connecting passageway between air collecting chamber 15 and the meter. Valve 20 is actuated between open and closed positions by the reciprocating movement of a link 21, said link being pin connected to a crank arm 22 secured to the pivoted support shaft 23 of butterfly valve 20. Link 21 connects to a piston rod 24 that is reciprocally mounted to an air cylinder 25, and being supported by an end plate 26 and an upper boss 27. Plate 26 is formed with a breather opening 28 that allows air to be taken in or expelled from cylinder 24 as a piston member 29 secured to piston rod 24 is reciprocated therewithin. A pair of screws 30 are employed to secure end plate 26 to the lower end of cylinder 24; and conventional type O-ring seals are provided within the upper end of boss 27, within the shaft opening of piston 29, and peripherally of said piston to define a fluid tight pressure chamber 31 within the upper end of cylinder 25.

A pressurized air supply 32 is adapted to be connected with chamber 31 through a passageway 33, a control valve 34 and a pressure line 35. For purposes of this invention, conventional air-brake pressure supplies may be used as the air supply 32. Valve 34 is float-operated in a manner which will be more particularly described in connection with FIGS. 4 and 5 for applying pressure into chamber 31 or for venting said chamber to an exhaust port.

Although air collection chamber 15 is essentially conventional, having an inlet opening 36 and a strainer 37 through which all fluid must pass before it is discharged around valve 20, the interior of air collecting chamber 15 communicates through an opening 38 with the interior of a bowl 39, formed integrally with boss 27 of cylinder 25. Therefore, any air collecting in chamber 15 is free to pass through opening 38 into the inner region of bowl 39, and depending upon the position of a valve member 40 secured to the upper end of piston rod 24, any and all air within chamber 15 may be discharged into a by-pass line 41, including a connector piece 42. With reference to FIG. 3, valve 40 is urged into engagement with the valve seat of bypass connector piece 42 by a helical spring 43, said spring being coaxial with boss 27 and piston rod 24.

Referring to FIGS. 4 and 5, control valve 34 is operated by a conventional float 44 disposed within air collection chamber 15. Float 44 rides on the surface of the liquid contained within the chamber while being attached to the extended end of a pivoted float arm 45, said float arm being secured to a lever 46 that is pivoted by a pin 47 from a support stud 48.

Control valve 34 comprises a housing 50 having a threaded inlet port 51 which connects an axial passageway 52 to the pressure air supply 32. An outlet port 53 communicates with passage 33 for transmitting air pressure to chamber 31 of air cylinder 25. Housing 50 further provides an exhaust port 54; and a sliding valve rod 55 disposed within passageway 52 provides alternate communication either between inlet 51 and outlet 53, or between outlet 53 and exhaust port 54. O-ring seals 56, 57 and 58 are provided within the passageway 52 to effect a seal against surfaces of the rod 55. However, only O-ring 58 engages rod 55 at all times; seals 56 and 57, by reason of the necked portion 55a of the slide rod, provide alternate communication between port 53 and inlet and exhaust ports 51 and 54, respectively.

An inspection of FIG. 5 will show that upon leftward movement of slide rod 55 from the position of FIG. 5, communication between port 53 and port 51 will be cut off almost immediately, whereas communication between port 53 and port 54 will not be established until a quite substantial amount of leftward movement has taken place. The same thing in reverse is done during rightward movement of the rod 55 from the position of FIG. 4.

This "lost motion" travel of rod 55 during which port 53 is not in communication with either of ports 51 and 54 corresponds to a float travel just sufficient to accumulate enough air so that the air bubble released between the opening of bypass valve 40 (by communication between ports 53 and 51) and its reclosing (by communication between ports 53 and 54) is of sufficient size to break the siphon.

Likewise, once the bypass valve 40 has closed and the siphon has been re-established, valve 40 cannot be reopened by the float until an amount of air sufficient to again break the siphon has accumulated in the collection chamber. In a typical installation, this amount may be on the order of 1½ pints; and the entire chamber capacity need not be substantially greater.

Slide rod 55 is provided with a transverse groove 59 in its extended end adjacent lever 46, and a stud 60 mounted to lever 46 is received in said groove. Accordingly, as float 44 rises or falls with the liquid level within chamber 15, slide rod 55 will be reciprocally moved by the pivotal movement of lever 46. FIG. 4 illustrates the position of slide rod 55 when chamber 15 is substantially filled with liquid. At such times the cylindrical seat containing seal ring 57 engages the peripheral surface of rod 55 preventing an application of air pressure between inlet 51 and outlet 53, but permitting outlet 53 to be vented through the cylindrical seat containing seal ring 56 to exhaust port 54.

As air or other gases collect within chamber 15, the liquid level therein will fall and the weight of float 44 will pivot lever 46 on pin 47 and move slide rod member 55 directionally to the right as shown in FIGS. 4 and 5. When the slide rod occupies the position of FIG. 5, the seat containing O-ring 57 no longer effects a seal with the surface of rod 55. Instead, the seat containing O-ring 56 now contacts the peripheral surface of the rod, thereby interrupting fluid communication between outlet 53 and exhaust port 54. Accordingly, the air pressure from supply 32 will now be applied through inlet 51, passage 52, outlet 53, passageway 33 and into chamber 31 of air cylinder 25. Referring to FIG. 3, piston 29 will be driven downward, compressing spring 43, thereby closing butterfly valve 20 while simultaneously opening valve member 40.

Operation of the above described metering system and apparatus will now be explained in connection with the common difficulties resulting from entrained air and air which has been trapped in the metering flow line.

It will be initially assumed that all air has been exhausted from air collecting chamber 15 so that float 44 and valve 34 are positioned as shown in FIG. 4. At this time, chamber 41 of air cylinder 25 is vented through passage 33, outlet 53, passageway 52 and exhaust port 54. Accordingly, spring 43 will force poppet valve 40 against the valve seat of bypass connector 42, while simultaneously positioning butterfly valve 20 in an open position, all as shown in FIG. 3. As fluid begins to flow from compartment 12, through air collecting chamber 15, metering apparatus 16, hose 14 and fill pipe 18, the rate of fluid flow will increase with the development of a "negative liquid head." After a maximum "negative head" is established, the rate of fluid flow will slowly diminish due to the gradual emptying of the truck tank, although it will be maintained at a relatively high rate determined, in any event, by the combined effect of both "positive" and "negative liquid heads."

When the level of liquid in compartment 12 nears empty, a vortex may be formed, drawing air into the flow stream, said air being collected in chamber 15. The collection of a sufficient amount of air to break the "negative head" (and the consequent lowering of the liquid level in the chamber) allows float 44 to drop to a point where float arm 45, lever 46 and stud 60 acting in groove 59, moves slide rod 55 of valve 34 to the position shown in FIG. 5. High-pressure air from source 32 is now transmitted through control valve 34 and applied to chamber 31 of air cylinder 25, forcing piston 29 sharply downwardly as to partially or completely close butterfly valve 20 and restricting the rate of flow or stopping the flow (depending on the design of the valve 20) through meter 16. Simultaneously, valve 40 will be moved sharply away from the seat of bypass connector 42 allowing the collected air in chamber 15 to flow through opening 38, connector piece 42 and bypass line 41 to the discharge side of meter 16. The combined effect of slowing or stopping the fluid through butterfly valve 20 and allowing a sufficiently large bubble of air to flow into discharge line 14 breaks the "negative liquid head" so that the siphon force thereof is no longer available to induce liquid flowthrough the meter.

As soon as butterfly valve 20 closes, the vortex formed in compartment 12 will immediately disappear, and therefore no more entrained air will be introduced into the flow stream.

Consequently, while poppet valve 40 is maintained open, the liquid level will sharply rise in chamber 15 until a sufficient amount of air to break the siphon has escaped from the chamber and float 44 is positioned at the high end of its stroke. Slide rod 55 will then be repositioned as shown in FIG. 4, thereby venting chamber 31 through passage 31, outlet port 53, passageway 52 and exhaust port 54. Spring 43 will then sharply move valve 40 into seated engagement with connector 42, closing bypass 41. In addition, butterfly valve 20 is sharply moved into a full-open position, permitting the liquid line to fill up with liquid and re-establish the "negative head."

When compartment 12 has been completely emptied of fluid and its internal flow control valve has been closed, a subsequent refilling of compartment 12 for the next delivery will tend to trap air between the compartment and the inlet opening 36 of collecting chamber 15. Therefore, when the flow control valve is again opened to permit fluid discharge from the compartment the trapped air will be forced into collecting chamber 15, whereupon float 44 will drop with the liquid level in the chamber, producing the same result as above described. Thus, the liquid flow will become partially or completely restricted by butterfly valve 20 while air is exhausted from the chamber through valve 40. This result prevents a "negative head" from being immediately developed. However, after the air within collection chamber 15 has been exhausted in the manner above described, and with the apparatus returned to the normal operating conditions shown in FIG. 3, the existing high level of "positive head" will create sufficient fluid flow to establish a "negative head," resulting in a high rate of flow.

Although various devices have been proposed for use with a gravity fed metering system, such devices are generally dependent upon a specific design of mobile tank truck, the use of vortex breakers or a conditional type of operation. Importantly, the apparatus herein described can be effectively used on conventional mobile tank trucks and tank compartments, contributing greatly to their use and providing economy of installation. Furthermore, this invention is not limited to metering systems where the inlet line between a vehicle compartment and meter must remain full. Metering equipment which depends upon such a condition of operation do not comply with some regulations and, in any event, are not permitted by many users.

Although a preferred embodiment of this invention has been illustrated and described, it is to be understood that various changes may be made without departing from the spirit of the invention or the scope of the attached claims, and each of such changes is contemplated. For example, while this disclosure particularly describes one type of control valve and an air cylinder, designed as to operate a normally closed valve in a bypass line and a normally open valve in the metering line, this arrangement of valve operation could be reversed.

What I claim and desire to secure by Letters Patent is:

1. A metering system for high-speed gravity liquid delivery vehicles having an air-brake pressure supply, said system comprising:
  (a) a liquid discharge line extending from a storage compartment on the vehicle, said discharge line having a meter therein and a float chamber connected upstream of said meter for collecting gases, and extending airtightly a substantial distance downwardly of said meter to provide a negative head when said line is filled with liquid;
  (b) a normally open first valve in said discharge line;
  (c) a bypass line connecting said float chamber to the discharge side of said meter;
  (d) a normally closed second valve connected to said bypass line; and
  (e) means for suddenly at least partially closing said first valve and opening said second valve in response to an accumulation of gas in said float chamber just sufficient to cause breaking of said negative head when discharged through said bypass line while said liquid is flowing at the reduced flow rate caused by said at least partial closing of said first valve;
(f) said last-named means including an air-operated means and a float-operated control valve, said air-operated means being connectable to the air-brake pressure supply through said control valve, and said control valve having an actuator float disposed in said float chamber and being reciprocatingly movable thereby through two valve actuating positions and an intermediate neutral position, said neutral position being sufficiently long to allow unrestricted discharge of the entire said gas accumulation in one direction of movement and accumulation of said sufficient gas accumulation in the other direction.

2. A metering system for high-speed gravity liquid delivery vehicles having an air-brake pressure supply, said system comprising:
   (a) a liquid discharge line having a meter therein, said discharge line extending airtightly a substantial distance downwardly of said meter to provide a negative head when said line is filled with liquid;
   (b) means including a float chamber connected in said discharge line upstream of said meter for collecting gases introduced into said line;
   (c) a first valve connected in said discharge line;
   (d) a bypass line connected between said float chamber and the discharge side of said meter;
   (e) a second valve connected in said bypass line;
   (f) means including an air cylinder for suddenly actuating said first valve to at least partially close and said second valve to open as soon as sufficient gas has accumulated in said float chamber to cause the breaking of said negative head when said accumulation of gas is discharged downstream of said meter through said bypass line;
   (g) means resiliently urging said first valve to open and said second valve to close;
   (h) a passageway with a float-operated control valve connected between said air-brake pressure supply and said air cylinder, said control valve having an inlet port connected to said pressure supply, an outlet connected to said air cylinder, an exhaust port, and a movable valve member for selectively connecting either said inlet port and outlet port or said outlet port and said exhaust, or closing said outlet port off altogether, and a float disposed within said float chamber for operating said movable valve member in response to the liquid level in said float chamber, the movement of said valve member through the zone where said outlet port is closed off altogether being sufficiently long to allow unrestricted discharge of the entire said gas accumulation in one direction of movement and accumulation of said sufficient gas accumulation in the other direction.

3. Apparatus for use in a high-speed gravity liquid discharge metering system to prevent registration of gases, comprising:
   (a) a liquid flow line having a meter connected therein and a float chamber connected therein on the upstream side of said meter, said flow line extending airtightly for a substantial distance downward of said meter to create a negative head downstream of said meter when said line is filled with liquid;
   (b) a first valve mounted in the discharge end of said float chamber;
   (c) a bypass line having one end connected to said float chamber and the other end connected to said flow line on the discharge side of said meter;
   (d) a second valve in said bypass line; and
   (e) externally powered means for simultaneously suddenly at least partially closing said first valve and opening said second valve, and vice versa, in response to predetermined liquid levels in said float chamber, said respective liquid levels being sufficiently spaced to permit accumulation of enough gases in said float chamber to break said negative head when said accumulated gases are discharged into said flow line upon opening of said second valve, and to permit unrestricted discharge of all of said accumulation of gases;
   (f) said last-named means comprising a source of air pressure, air cylinder means for actuating said first and second valves, and a float-operated control valve having a float disposed in said float chamber for selectively connecting said air cylinder means to said source of air pressure or to an exhaust, said control valve having an intermediate lost-motion position to provide a time delay between said connection of said air cylinder means to said exhaust and said connection thereof to said source of air pressure, sufficient to permit the accumulation of a substantial amount of gas in said float chamber before the discharge thereof through said second valve, and to permit full discharge of said accumulated gas before re-closing said second valve.

References Cited

UNITED STATES PATENTS

| | | | |
|---|---|---|---|
| 1,622,715 | 3/1927 | Hawxhurst | 73—200 |
| 2,093,952 | 9/1927 | Brubaker | 73—200 X |
| 2,103,020 | 12/1937 | Saarinen | 73—200 X |
| 2,318,264 | 5/1943 | Smith | 73—200 |
| 3,040,573 | 6/1962 | Berck | 73—200 |
| 3,040,574 | 6/1962 | Berck | 73—200 |
| 3,081,627 | 3/1963 | Reed et al. | 73—200 |
| 3,135,114 | 6/1964 | Granberg | 73—200 |

OTHER REFERENCES

German printed application, 101,561, September 1957.

RICHARD C. QUEISSER, *Primary Examiner.*

EDWARD D. GILHOOLY, *Assistant Examiner.*